(12) United States Patent
Van Der Vliet et al.

(10) Patent No.: US 7,805,037 B1
(45) Date of Patent: Sep. 28, 2010

(54) MULTIPLEXER HAVING IMPROVED EFFICIENCY

(75) Inventors: Frederik Marcel Van Der Vliet, Pasadena, CA (US); Joan Fong, San Marino, CA (US); Dazeng Feng, Arcadia, CA (US); Wenhua Lin, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 1268 days.

(21) Appl. No.: 10/644,395

(22) Filed: Aug. 19, 2003

(51) Int. Cl.
*G02B 6/26* (2006.01)
*G02B 6/42* (2006.01)
*G02B 6/10* (2006.01)

(52) U.S. Cl. .................................. 385/43; 385/129

(58) Field of Classification Search ................ 385/39, 385/43, 129–132
See application file for complete search history.

(56) References Cited

U.S. PATENT DOCUMENTS

| | | |
|---|---|---|
| 4,114,257 A | 9/1978 | Bellavance |
| 4,747,654 A | 5/1988 | Yi-Yan |
| 4,750,799 A | 6/1988 | Kawachi et al. |
| 4,813,757 A | 3/1989 | Sakanao et al. |
| 4,836,645 A | 6/1989 | Lefevre et al. |
| 4,846,542 A | 7/1989 | Okayama et al. |
| 4,876,446 A | 10/1989 | Kambe et al. |
| 4,904,039 A | 2/1990 | Soref |
| 4,956,682 A | 9/1990 | Ohnaka et al. |
| 5,013,113 A | 5/1991 | Soref |
| 5,123,069 A | 6/1992 | Okayama et al. |
| 5,231,683 A | 7/1993 | Hockaday et al. |
| 5,347,601 A | 9/1994 | Ade et al. |
| 5,420,953 A | 5/1995 | Boudreau et al. |
| 5,511,142 A | 4/1996 | Horie et al. |
| 5,546,483 A | 8/1996 | Inoue et al. |
| 5,581,643 A | 12/1996 | Wu |
| 5,586,209 A * | 12/1996 | Matsuura et al. ............. 385/45 |
| 5,627,928 A * | 5/1997 | Matsuura et al. ............. 385/45 |
| 5,682,453 A * | 10/1997 | Daniel et al. ................. 385/99 |
| 5,710,847 A | 1/1998 | Takano et al. |
| 5,723,173 A | 3/1998 | Fukuoka et al. |

(Continued)

FOREIGN PATENT DOCUMENTS

EP 0849615 A2 6/1998

(Continued)

OTHER PUBLICATIONS

Aronson, L. B. et al., *Low-Cost Multimode WDM for Local Area Networks Up to 10 Gb/S*, IEEE Photonics Technology Letters, vol. 10, No. 10, Oct. 1998, pp. 1489-1491.

(Continued)

*Primary Examiner*—Kevin S Wood
(74) *Attorney, Agent, or Firm*—Gavrilovich, Dodd & Lindsey, LLP

(57) ABSTRACT

The multiplexer includes multi-mode waveguides positioned on a base such that a plurality of the waveguides serve as input waveguides and one or more of the waveguides serve as an output waveguide. The waveguides intersect one another such that light signals traveling along a plurality of the input waveguides are combined onto an output waveguide. At least a portion of the input waveguides including a taper configured to taper the width of a light signal traveling along the input waveguide toward the output waveguide.

53 Claims, 9 Drawing Sheets

U.S. PATENT DOCUMENTS

| | | | |
|---|---|---|---|
| 5,841,929 | A | 11/1998 | Komatsu et al. |
| 5,889,902 | A | 3/1999 | Laube et al. |
| 5,909,523 | A | 6/1999 | Sakaino et al. |
| 6,278,168 | B1 | 8/2001 | Day |
| 6,393,172 | B1 | 5/2002 | Brinkman et al. |
| 6,434,302 | B1 * | 8/2002 | Fidric et al. .................... 385/43 |
| 6,580,863 | B2 | 6/2003 | Yegnanarayanan et al. |
| 6,885,795 | B1 | 4/2005 | Hsu et al. |
| 6,921,490 | B1 | 7/2005 | Qian et al. |
| 6,925,228 | B2 * | 8/2005 | Kamei et al. .................. 385/37 |
| 6,973,234 | B2 * | 12/2005 | Hasegawa et al. ............. 385/31 |
| 2001/0053265 | A1 | 12/2001 | Yamashita et al. |
| 2003/0044118 | A1 | 3/2003 | Zhou et al. |
| 2003/0133661 | A1 | 7/2003 | Adibi et al. |

FOREIGN PATENT DOCUMENTS

| | | |
|---|---|---|
| JP | 63197923 | 8/1988 |
| JP | 04358105 A | 12/1992 |
| JP | 11064657 | 3/1999 |

OTHER PUBLICATIONS

Baba, S. et al., *A Novel Integrated-Twin-Guide (ITG) Optical Switch with a Built-in TIR Region*, IEEE Photonics Technology Letters, vol. 4, No. 5, May 1992, pp. 486-488.

Betty, I. et al., *A Robust, Low-Crosstalk, InGaAsP/InP Total-Internal-Reflection Switch For Optical Cross-Connect Application*.

Brenner, T. et al., *Vertical InP/InGaAsP Tapers for Low-Loss Optical Fibre-Waveguide Coupling*, Electronics Letters Oct. 22, 1992, vol. 28 No. 22, pp. 2040-2041.

Burns, W.K. et al., *Mode Conversion in Planar-Dielectric Separating Waveguides*; IEEE Journal of Quantum Electronics, vol. QE-11, No. 1, Jan. 1975; p. 32-39.

Dumbravescu, N., *3-D Resolution Gray-Tone Lithography*, Proceedings of SPIE vol. 4019 (2000) pp. 570-577.

Goel, K et al *Design Considerations for Low Switching Voltage Crossing Channel Switches*; Journal of Lightwave Technology, vol. 6, No. 6, Jun. 1988; p. 881-886.

Granestrand, P. et al., *Integrated Optics 4x4 Switch Matrix with Digital Optical Switches*; Electronics Letters, vol. 26, No. 1, Jan. 4, 1990; p. 4-5.

Hida, Y. et al., *Highly Compact Silica-Based PLC-type 1x32 Splitters Using 127 μm-sacing Output and 0.4%-Δ Waveguides*, Electronics Letters, vol. 34, No. 1, Jan. 8, 1998; p. 75-76.

Huang, T.C. et al., *Depletion Edge Translation Waveguide Crossing Optical Switch*; IEEE Photonics Technology Letters; vol. 1, No. 7, Jul. 1989, p. 168-170.

Ito, F. et al., *Carrier-Injection-Type Optical Switch in GaAs With A 1.06-1.55 μm Wavelength Range*; Appl. Physics Letters, 54(2) Jan. 9, 1989; p. 134-136.

Jeon, S. et al., *Simple Fabrication Method for Vertical Taper Using Tensile Stress-Induced Mask and Selective Etching Technique*, CLEO Pacific Rim '99 WR&, pp. 320-321.

Kasahara, R. et al., *Low-Power Consumption Slica-Based 2x2 Thermooptic Switch Using Trenched Silicon Substrate*, IEEE Photonics Technology Letters, vol. 11, No. 9, Sep. 1999, p. 1132-1134.

Khan, M.N. et al., *Fabrication-Tolerant, Low-Loss, and High-Speed Digital Optical Switches in InGaAsP/InP Quantum Wells*; Proc 21$^{st}$ Eur.Conf.on Opt.Comm.(ECOC '95-Brussels), p. 103-106.

Kirihara, T. et al., *Lossless and Low Crosstalk 4x4 Optical Switch Array; Electronics and Communications in Japan*, Part 2, vol. 77, No. 11, 1994, p. 73-81.

Kirihara, T. et al., *Lossless and Low-Crosstalk Characteristics in an InP-Based 2x2 Optical Switch*, IEEE Photonics Technology Letters, vol. 5, No. 9 Sep. 1993, p. 1059-1061.

Kley, et al., *Fabrication and Properties of Refractive Micro-Optical Profiles for Lenses, Lens arrays and Beam Shaping Elements*, Proceedings of SPIE vol. 4231 (2000), pp. 144-152.

Liu, Y.L. et al., *Silicon 1x2 Digital Optical Switch Using Plasma Dispersion*; Electronics Letters, vol. 30, No. 2, Jan. 20, 1994; p. 130-131.

Moerman, I. et al., *A Review on Fabrication Technologies for the Monolithic Integration of Tapers with III-V Semiconductor Devices*; IEEE Journal of Selected Topics in Quantum electronics, vol. 3, No. 6, Dec. 1997, p. 1308-1320.

Müller, G. et al., *First Low Loss InP/InGaAsP Optical Switch with Integrated Mode Transformers*; ThC12.10; p. 37-40.

Nayyer, J. et al., *Analysis of Reflection-Type Optical Switches with Intersecting Waveguides*, Journal of Lightwave Technology, vol. 6, No. 6, Jun. 1988; p. 1146-1152.

Negami, t. et al., *Guided-Wave Optical Wavelength Demultiplexer Using an Asymmetric Y Junction*; Appl. Phys. Lett. 54 (12), Mar. 20, 1989; p. 1080-1082.

Nelson, W. et al., *Optical Switching Expands Communications-Network Capacity*, Laser Focus World, Jun. 1994, p. 517-520.

Nelson, W.H. et al, *Wavelength-and Polarization-Independent Large Angle InP/InGaAsP Digital Optical Switches with Extinction Ratios Exceeding 20 dB*; IEEE Photonics Technology Letters, vol. 6, No. 11, Nov. 1994; p. 1332-1334.

Okayama, H. et al., *8x8 Ti:LiNbO$_3$ Waveguide Digital Optical Switch Matrix*; IEICE Trans. Commun.; vol. E77-B, No. 2; Feb. 1944; p. 204-208.

Okayama, H. et al., *Reduction of Voltage-Length Product for Y-Branch Digital Optical Switch*, Journal of Lightwave Technology, vol. 11, No. 2, Feb. 1993; p. 379-387.

Pennings E., *Integrated-Optic Versus Microoptic Devices for Fiber-Optic Telecommunication Systems: A Comparison*; Journal of Selected Topics in Quantum Electronics, vol. 2-No. 2, pp. 151-164.

Reimer, K. et al., *Micro-Optic Fabrication Using One-Level Gray Tone Lithography*, SPIE vol. 3008, pp. 279-288.

Reimer, K. et al, *One-Level Gray-Tone Lithography Mask Data Preparation and Pattern Transfer*, SPIE vol. 2783, pp. 71-79.

Renaud, M. et al., *Compact Digital Optical Switches for Low Insertion Loss Large Switch Arrays on InP*; Proc. 21$^{st}$ Eur.Conf.on Opt. Comm. (ECOC '95-Brussels), pp. 99-102.

Rickman, A. G. et al., *Silicon-on-Insulator Optical Rib Waveguide Loss and Mode Characteristics*, Journal of Lightwave Technology, Oct. 1994, vol. 12-No. 10, pp. 1771-1776.

Rolland, C. et al., *10 Gbit/s, 1.56 μm, Multiquantum Well InP/InGaAsP Mach-Zehnder Optical Modulator*; Electronics Letters, Mar. 4, 1993, vol. 29, No. 5, p. 471-472.

Silberberg, Y. et al., *Digital Optical Switch*; Appl. Phys. Lett.; vol. 51, No. 16, Oct. 19, 1987, p. 152-154.

Sneh, A. et al., *Compact Low Crosstalk and Low Propagation Loss Quantum-Well Y-Branch Switches*; PDP 4-1~4-5.

Stoll, L. et al., *1:8 Optical Matrix Switch on InP/InGaAsP with Integrated Mode Transformers*; Optical Switches and Modulators II, p. 531-534.

Sugita, A. et al., *Very Low insertion Loss Arrayed-Waveguide Grating with Vertically Tapered Waveguides*, IEEE Photonics Technology Letters, vol. 12, No. 9, Sep. 2000; p. 1180-1182.

Tada, K. et al., *Bipolar Transistor Carrier-Injected Optical Modulator/Switch: Proposal and Analysis*, IEEE Electron Device Letters, vol. EDL-7, No. 11, Nov. 1986, p. 605-606.

Vinchant et al, *InP 4x1 Digital-Optical-Switch Module For Multiwavelength Cross-Connect Applications*; OFC '95 Technical Digest, Thursday ThK2, p. 281-282.

Vinchant, J.F. et al., *First Polarisation insensitive 4x4 Switch matrix on InP with Digital Optical Switches*, TuB7.3, p. 341-344.

Vinchant, J.F. et al., *InP Digital Optical Switch: Key Element for Guided-Wave Photonic Switching*; IEE Proceedings-J, vol. 140, No. 5, Oct. 1993; p. 301-307.

Vinchant, J.F. et al., *Low Driving Voltage or Current Digital Optical Switch on InP for Multiwavelength System Applications*; Electronics Letters, vol. 28, No. 12, Jun. 4, 1992; p. 1135-1137.

Wanru, Z. et al., *Total Internal Reflection Optical Switch with Injection Region Isolated by Oxygen Ion Implantation*; p. 1-10.

Yanagawa, H. et al., *Polarization-and Wavelength-Insensitive Guided-Wave Optical Switch with Semiconductor Y Junction*; Journal of Lightwave Technology, vol. 8, No. 8, Aug. 1990, p. 1192-1197.

\* cited by examiner

MULTIPLEXER HAVING IMPROVED EFFICIENCY

RELATED APPLICATIONS

This application is related to U.S. patent application Ser. No. 10/600,748, filed on Jun. 20, 2003, entitled "Multiplexer Having Improved Efficiency" and incorporated herein in its entirety.

BACKGROUND

1. Field of the Invention

The invention relates to optical devices. In particular, the invention relates to optical multiplexers.

2. Background of the Invention

A common type of optical multiplexer includes a plurality of waveguides that intersect one another so as to combine light signals traveling along a plurality of input waveguides onto a smaller number of output waveguides. Each waveguide intersection increases the angle at which light signals are incident on the side of the waveguide. This angle is called the propagation angle. If the propagation angle is increased far enough, the waveguides can fail to constrain the light signal.

The propagation angle that can be supported by a waveguide is often a function of the waveguide material. For instance, multi-mode silicon waveguides can support higher propagation angles than multi-mode silica waveguides. As a result, a multi-mode multiplexer having silicon waveguides will support propagation angles that are not supported by a multi-mode silica fiber. When the multiplexer is coupled with the optical fiber such that a light signal travels from the multiplexer to the optical fiber, the portion of a light signal having high propagation angles will be lost upon entering the optical fiber. Accordingly, the increase in propagation angles caused by the waveguide intersections can serve as a source of optical loss.

For the above, reasons there is a need for a multiplexer having a reduced optical loss.

SUMMARY OF THE INVENTION

An optical device is disclosed. The optical device includes multi-mode waveguides positioned on a base such that a plurality of the waveguides serve as input waveguides and one or more of the waveguides serve as an output waveguide. The waveguides intersect one another such that light signals traveling along a plurality of the input waveguides are combined onto an output waveguide. At least a portion of the input waveguides include a taper configured to taper the width of a light signal traveling along the input waveguide toward the output waveguide.

A method of forming an optical device is also disclosed. The method includes etching a wafer having a light-transmitting medium positioned on a base so as to form a plurality of multi-mode waveguides on the base. The waveguides are formed such that a plurality of the waveguides serve as input waveguides and one or more of the waveguides serve as an output waveguide. The waveguides intersect one another such that light signals traveling along a plurality of the input waveguides are combined onto an output waveguide. At least a portion of the input waveguides are formed so as to include tapers configured to contract a width of a light signal traveling along the input waveguide toward the output waveguide.

At least a portion of the contraction tapers can taper from an expanded end to a contracted end having a width less than 80% of the width of the expanded end, less than 60% of the width of the expanded end and most preferably less than 30% of the width of the expanded end. In some instances, at least a portion of the contraction tapers has a contracted end with a width greater than 12 μm. At least a portion of the contraction tapers have a ratio of the taper length:taper width less than 200:1, less than 40:1 and/or greater than 8:1.

In some instances, at least one output waveguide includes an expansion taper configured to expand a light signal traveling along the output waveguide from an input waveguide. At least a portion of the expansion tapers can expand from a contracted end to an expanded end. The contracted end has a width less than 80% of the width of the expanded end or less than 60% of the width of the expanded end. At least a portion of the contraction tapers have a ratio of the taper length:taper width less than 200:1, less than 40:1 and/or greater than 8:1.

In some instances, the tapers are formed such that the thickness of the contraction taper and/or the expansion tapers remain substantially constant along the length of the contraction taper.

DETAILED DESCRIPTION

A multiplexer is disclosed. The multiplexer includes a plurality of waveguides that intersect one another so as to combine light signals traveling along a plurality of input waveguides onto a smaller number of output waveguides. The input waveguides can include a contraction taper configured to contract the width of the input waveguide before the input waveguides reach a waveguide intersection. As a result, the width of the waveguides at the intersections is narrower than these widths would be without the contraction tapers. Reducing the width of the waveguides at the intersections reduces the increase in the propagation angle that results from the intersection. As a result, the taper provides for a reduction in the amount of the propagation angle increase that occurs at each waveguide intersection. Additionally, reducing the reduced waveguide widths can improve mixing of the light signals and can accordingly improve the output uniformity.

In some instances, the output waveguide includes an expansion taper configured to expand the width of a light signal traveling along the output waveguide. In some instances, the expansion taper can compensate for at least a portion of the propagation angle increase that occurs at the contraction taper. As a result, the remaining increases in propagation angle stem largely from the waveguide intersections. As noted above, this increase in propagation angles is reduced because of the reduced waveguide width. Accordingly, the total increase in propagation angles associated with the multiplexer is reduced.

In some instances, the waveguides that provide input to an intersection are narrower than the waveguide that carry the output from a waveguide intersection. This intersection construction is also associated with a reduced amount of the propagation angle increase. Because this construction increases the width of the downstream waveguides, this construction can be employed in place of an expansion taper or in conjunction with an expansion taper.

Figure 1A:
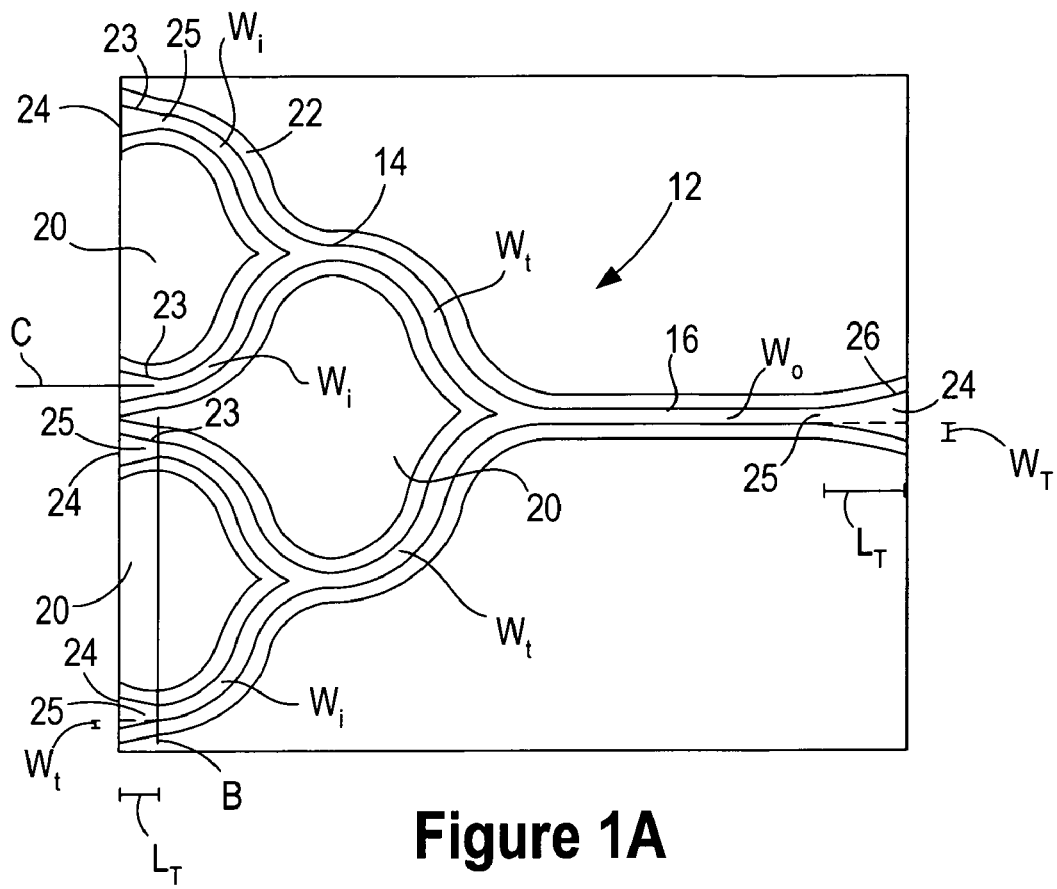
FIG. 1A is a top view of an optical device having a multiplexer. The multiplexer includes a plurality of waveguides intersecting one another such that light signals traveling along an input waveguide are combined onto a smaller number of output waveguides. The input waveguides include a contraction taper and the output waveguide includes an expansion taper.
Figure 1B:
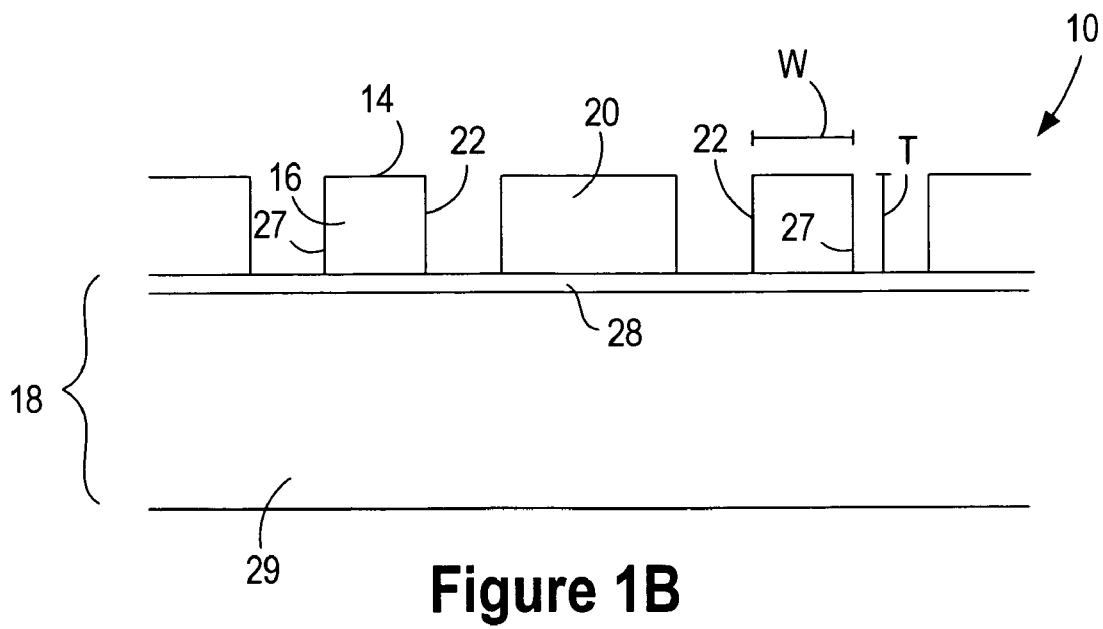
FIG. 1B is a cross section of the optical device shown in FIG. 1A taken along the line labeled B.
Figure 1C:
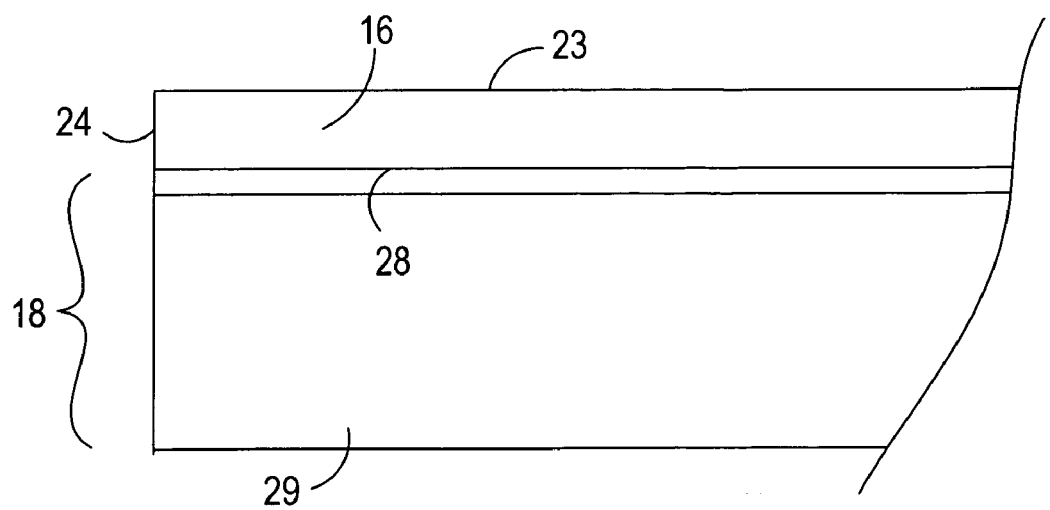
FIG. 1C is a cross section of the optical device shown in FIG. 1A taken along the line labeled C.

FIG. 1A is a top view of an optical device 10 having a multiplexer 12. FIG. 1B is a cross section of the optical device 10 shown in FIG. 1A taken along the line labeled B. FIG. 1C is a cross section of the optical device 10 shown in FIG. 1A taken along the line labeled C. The optical device 10 includes a plurality of waveguides 14 defined by a ridge of a light-transmitting medium 16 extending from a base 18. Each waveguide 14 has a width labeled W and a thickness labeled T.

The portion of the base 18 adjacent to the light-transmitting medium 16 constrains the light signals within a waveguide 14. For instance, the upper surface of the base 18 can have an index of refraction less than the index of refraction of the light-transmitting medium 16. The reduced index of refraction reflects light signals from the light-transmitting medium 16 back into the light-transmitting medium 16.

The optical device 10 includes a plurality of inactive regions 20 formed in the light transmitting medium 16. The inactive regions 20 do not carry light signals during the operation of the multiplexer 12. The inactive regions 20 are spaced apart from the waveguides 14 so as to partially define a waveguide trench 22 adjacent to the waveguides 14.

A plurality of the waveguides 14 labeled $W_i$ serve as input waveguides 14. The waveguides 14 are arranged so as to combine the light signals from the input waveguides 14 into an output waveguide 14 labeled $W_o$. Each input waveguide 14 intersects another input waveguide 14. A transition waveguide 14 labeled $W_t$ extends from each intersection of input waveguides 14. The transition waveguides 14 intersect one another. The output waveguide 14 extends from the intersection of the transition waveguides 14.

The input waveguide 14 includes a contraction taper 23. The width of the contraction taper 23 contracts from an expanded end 24 to a contracted end 25. As is evident from FIG. 1C, the thickness of the contraction taper 23 can remain substantially constant along the length of the contraction taper 23. As a result, the contraction taper 23 contracts the width of a light signal traveling along the input waveguide 14. As noted above, the contraction taper 23 allows narrower waveguides to be used at the waveguide 14 intersections. Reducing the width of the waveguides 14 at an intersection reduces the amount of the propagation angle increase that results from that intersection.

The dimensions of the expanded end 24 can be matched to the source of a light signal that will travel along the input waveguide 14. For instance, a variety of lasers produce a light signal that diverges more vertically than horizontally. Accordingly, the thickness of the expanded end 24 can exceed the width of the expanded end 24 so as to match the dimensions of the expanded end 24 to the geometry of the light signal source. In some instances, the thickness of the expanded end 24 is more than 1.4 times the width of the expanded end 24.

Increasing the degree of contraction provided by the contraction taper 23 generally reduces the increase in propagation angles at each intersection. In some instances, the contraction taper 23 is configured such that the width of the contracted end 25 is less than 80% of the width of the expanded end 24, less than 60% of the width of the expanded end 24 or most preferably or less than 30% of the width of the expanded end 24. The smoothness of the waveguide sidewalls can limit the degree of contraction that is possible. For instance, when the expanded end 24 has a width of about 32 µm, current limitations in waveguide etching technology structures may limit the width of the contracted end 25 to widths greater than 6 µm. This limitation may change as fabrication processes improve. Accordingly, the width of the contracted end 25 is generally greater than 6 µm. Suitable widths for the contracted end 25 include, but are not limited to, lengths greater than 10 µm. In one example, the width of the expanded end 24 is about 32 µm while the width of the contracted end 25 is about 22 µm.

The taper rate can affect the amount of propagation angle increase caused by the contraction taper. For instance, a large taper rate can cause a larger increase in the propagation angle than a low taper rate. One method of measuring the taper rate is the ratio of the taper length:the taper width. The taper width is labeled $W_T$ in FIG. 1A and the taper length is labeled $L_T$ in FIG. 1A. Suitable taper ratios for the contraction taper include, but are not limited to, ratios less than 200:1, less than 40:1 and/or greater than 8:1. Suitable taper lengths, $L_T$, for the contraction taper, include, but are not limited to, lengths greater than 400 µm or 1200 µm and/or lengths less than 1700 µm or 2000 µm. Although the taper is shown as tapering linearly along the taper length, the taper can have a non-linear taper along the taper length. Accordingly, the sides of the contraction taper can appear non-linear when viewed from over the optical device.

The output waveguide 14 includes an expansion taper 26. The expansion taper 26 expands from a contracted end 25 to an expanded end 24. The thickness of the expansion taper 26 can remain substantially constant along the length of the expansion taper 26. As a result, the expansion taper 26 expands the width of a light signal traveling along the output waveguide 14. Because a waveguide region having an expanding width can reduce the propagation angle, the expansion taper 26 can serve to reduce the propagation angle. In some instances, the expansion taper 26 compensates for increases in the propagation angle that result from the use of the contraction taper 23.

Increasing the degree of expansion provided by the expansion taper 26 generally increases the amount of reduction in the propagation angle that is provided by the expansion taper 26. In some instances, the expansion taper 26 is configured such that the width of the contracted end 25 is less than 80% of the width of the expanded end 24 or less than 60% of the width of the expanded end 24. Most preferably, the expansion taper 26 is configured such that the width of the contracted end 25 is less than 30% of the width of the expanded end 24. The dimensions of the expanded end 24 can be matched to a component that will receive light signals from the expansion taper 26. For instance, the expanded end 24 can have dimensions suitable for coupling with an optical fiber. In one example, the width of the expanded end 24 is about 32 μm while the width of the contracted end 25 is about 12 μm. The dimensions of the expanded end 24 of a contraction taper 23 need not be the same as the dimensions of the expanded end 24 of an expansion taper 26.

The taper rate can affect the amount of propagation angle reduction caused by the expansion taper. One method of measuring the taper rate is the ratio of the taper length:the taper width. The taper width is labeled $W_T$ in FIG. 1A and the taper length is labeled $L_T$ in FIG. 1A. Suitable taper ratios for the contraction taper include, but are not limited to, ratios less than 200:1, less than 40:1 and/or greater than 8:1. Suitable taper lengths, $L_T$, for the contraction taper, include, but are not limited to, lengths greater than 400 μm or 1200 μm and/or lengths less than 1700 μm or 2000 μm. Although the taper is shown as tapering linearly along the taper length, the taper can have a non-linear taper along the taper length. Accordingly, the sides of the expansion taper can appear non-linear when viewed from over the optical device.

Although each of the input waveguides are shown as having a contraction taper, in some instances, one or more of the input waveguides does not include an input waveguide. In these instances, the reduction in propagation angle provided by the expansion taper may be sufficient to provide the desired performance. In some instances, none of the input waveguides includes a contraction taper.

Figure 2A:
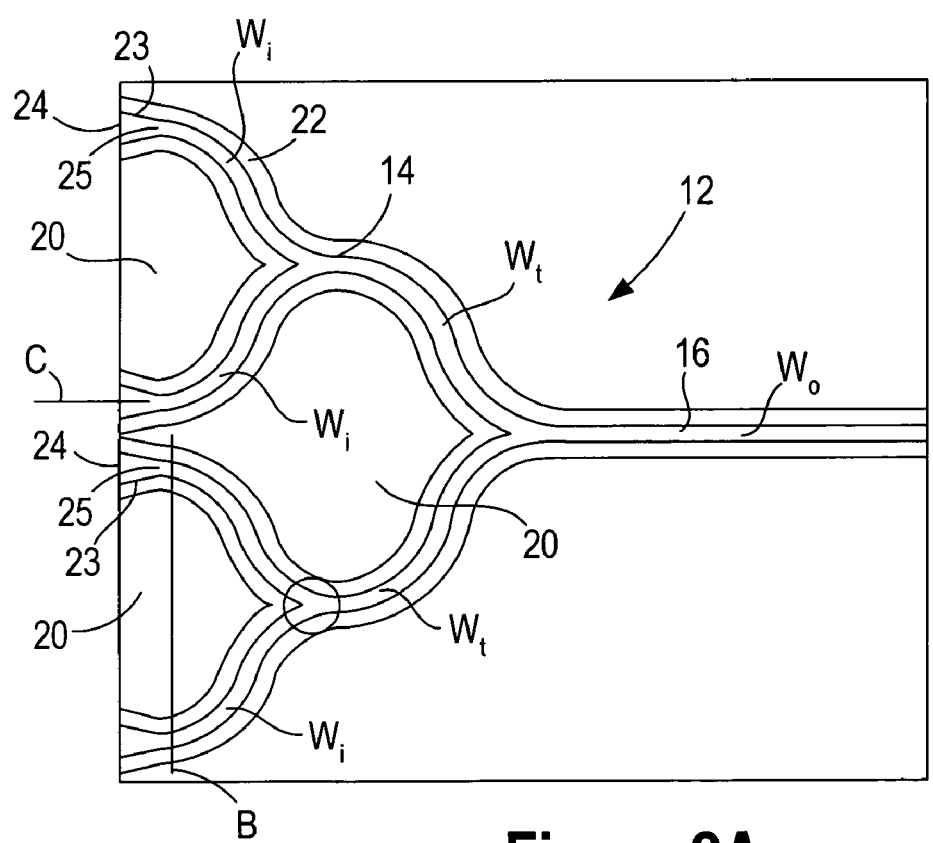
FIG. 2A is a top view of an optical device having a multiplexer. The multiplexer includes a plurality of waveguides intersecting one another such that light signals traveling along an input waveguide are combined onto a smaller number of output waveguides. The input waveguides include a contraction taper. The waveguide intersections are constructed such that the waveguide carrying output from the waveguide intersections are wider than each of the waveguides carrying input to the intersection.
Figure 2B:
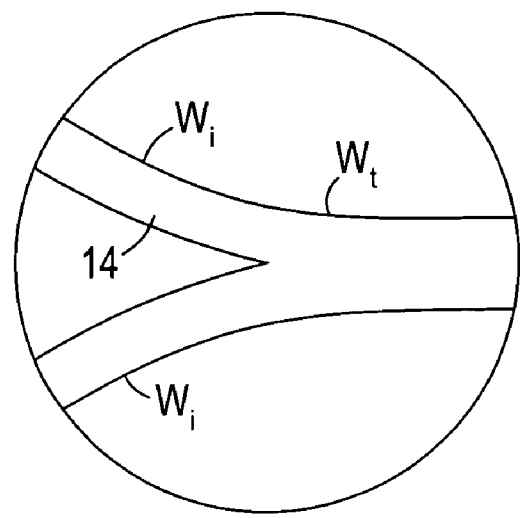
FIG. 2B is a close-up of the waveguide intersection shown by the circle labeled A in FIG. 2A.

The waveguide intersections can also be constructed to reduce the amount of propagation angle increase as shown in FIG. 2A. FIG. 2A is a top view of an optical device having a multiplexer 12. FIG. 2B is a close-up of the waveguide intersection shown by the circle labeled A in FIG. 2A. The input waveguides have about the same width and the transition waveguide is wider than either of the input waveguides. As a result, the degree of taper that occurs at this intersection is reduced from the degree of taper that would occur if each of the waveguides had the same width. The reduce degree of taper reduces the amount of propagation angle increase at this intersection.

The condition of an intersection having a reduced propagation angle increase can generally be met when the waveguide carrying output from a waveguide intersection is wider than either of the waveguides carrying input to the waveguide intersection. Although this condition is described in the context of an intersection between an input waveguide and a transition waveguide, this principle can be applied to other intersections on the multiplexer. In some instances, this principle is applied to each intersection on the multiplexer.

The output waveguide shown in FIG. 2A does not include an expansion taper 26. In some instances the expansion taper 26 is not desired because the increase in waveguide width at one or more of the intersections increases the width of the output waveguide to the desired width. In some instances, the output waveguide of a multiplexer constructed according to FIG. 2A includes an expansion taper 26.

As noted above, the contraction taper 23 and the expansion taper 26 need not taper vertically. A taper that tapers in width but does not taper vertically does not add substantial fabrication complexity of the multiplexer. In some instance, the contraction taper 23 and/or the expansion taper 26 can taper vertically. One application where some degree of vertical taper may be desired is where the thickness that is suitable for the expanded end 24 of a contraction taper 23 is different from the thickness that is suitable for the expanded end 24 of an expansion taper 26. In these instances, the contraction taper 23 and/or the expansion taper 26 can be vertically tapered so the expanded end 24 of a contraction taper 23 the expanded end 24 of an expansion taper 26 each have the desired thickness.

The dimensions of the waveguides 14 in FIG. 1A through FIG. 2C are selected such that the waveguides 14 are multi-mode waveguides 14. When single mode waveguides 14 are employed, the optical loss at each intersection can be higher than 3 dB. The use of multi-mode waveguides 14 can substantially reduce the amount of loss at the intersections. Multi-mode waveguides 14 can provide intersections with an optical loss near zero. Further, the losses at the bends of multi-mode waveguides are smaller than the losses at the bends of mono-mode waveguides. As a result, the use of multi-mode waveguides 14 can reduce the optical loss associated with multiplexers 12 having cascaded waveguide 14 intersections.

The use of multimode waveguides allows the sides of the waveguide to extend to the base 18 as shown in FIG. 1B. Extending the sides 27 of the waveguide 14 to the base 18 reduces leakage of the light signals from the waveguides 14 and further reduces the optical loss associated with the optical device 10. In some instances, extending the sides 27 of the waveguides 14 to the base 18 can simplify the fabrication process and accordingly provide fabrication cost savings. Although not illustrated, the sides of the waveguide need not extend all the way to the base. Accordingly, the waveguide can be defined by a ridge extending from a slab of the light transmitting medium. When the waveguides are defined by a ridge extending from a slab of the light transmitting medium, the waveguide thickness is the distance between the base and the top of the ridge and the waveguide with is the width of the ridge.

Suitable dimensions for the waveguides include a thickness greater than 10 μm and waveguide 14 widths greater than 10 μm. Waveguide dimensions on the order of 10 μm are close to the mode field diameter of the laser and can require accurate laser positioning. In one example, the thickness of the waveguides 14 is between 16 μm and 75 μm and the width of the waveguides 14 is between 16 μm and 75 μm. The width and thickness of the waveguides 14 can be selected so the waveguides 14 have a substantially rectangular cross section. In some instances, the width and thickness of the waveguides 14 are selected so the waveguides 14 have a substantially square cross section.

A suitable width for the waveguide trenches 22 includes widths greater than 10 μm but dimensions as low as 0.1 μm are possible. In some instances, it is desirable to coat the walls of the trenches with silica. Accordingly, the ability to coat the walls of the trenches with silica may determine the lower limit to the trench width. In one example, the waveguide trenches 22 have a width of 15 μm to 60 μm.

Suitable light transmitting media include, but are not limited to, silicon, polymers, silica, SIN, GaAs, InP and $LiNbO_3$. In some instances, the light transmitting medium 16 is silicon. Silicon supports more modes than other materials due to the higher index of refraction. Further silicon supports higher order modes more efficiently than other materials. Additionally, silicon has an index of refraction that is higher than many typical light transmitting medium 16. As a result, light signals are better coupled into the light transmitting medium 16 from a source such as a laser or an optical fiber. The improved coupling and improved efficiency further reduce the optical loss associated with the optical device 10.

The use of a silicon light transmitting medium 16 also allows the optical device 10 to be fabricated from a silicon-on-insulator wafer. A silicon-on-insulator wafer generally includes an insulator 28 between a substrate 29 and a layer of silicon that serves as the light transmitting medium 16. In many instances, the insulator 28 is a layer of silica and the substrate 29 is a layer of silicon. A silicon-on-insulator wafer provides a platform on which a plurality of optical components can often be integrated. As a result, the optical device 10 can include optical components in addition to the multiplexer 12 or can include a plurality of multiplexers 12.

Figure 3A:
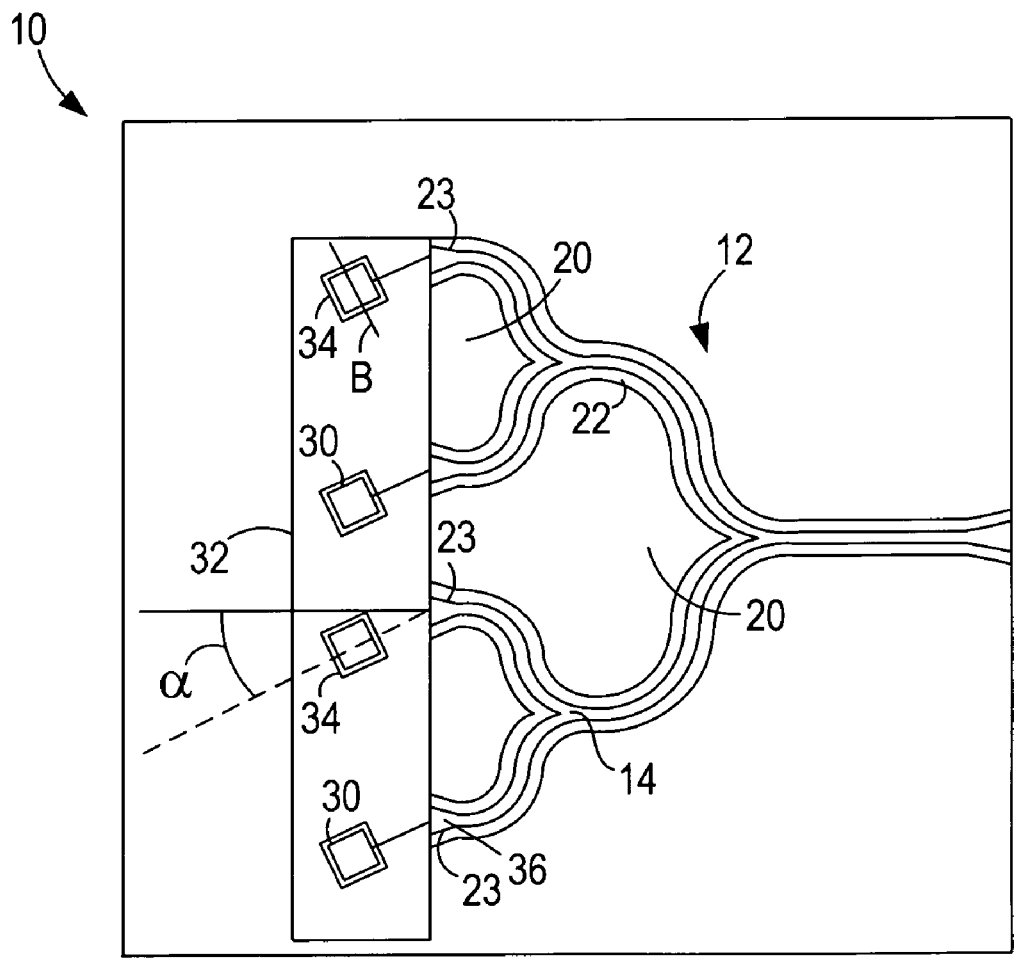
FIG. 3A is a top view of an optical device having a multiplexer integrated with a plurality of light sources.
Figure 3B:
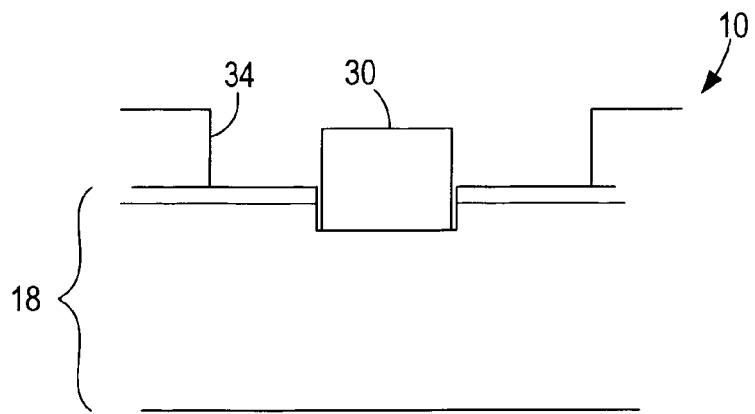
FIG. 3B is a cross section of the optical device shown in FIG. 3A taken along the line labeled B.

FIG. 3A provides an example of an optical device 10 having an optical component in addition to the multiplexer 12. FIG. 3A is a top view of an optical device 10 having a plurality of light sources 30 integrated with a multiplexer 12. FIG. 3B is a cross section of the optical device 10 taken along the line labeled B in FIG. 3A. A laser chip is an example of a light source 30 that is suitable for producing light signals for use with the multiplexer 12. Suitable lasers for use with the optical device 10 include, but are not limited to, distribution feedback lasers.

The optical device 10 includes a common trench 32 where lasers can be positioned. The lasers are each positioned in a recess 34 formed in the common trench 32. The depth of the recess 34 is formed such that the light signal produced by a laser is incident on a waveguide 14 facet 36 at the desired height on the facet 36. In some instances, the laser is flipped upside down to provide the proper relationship orientation of the resultant light signal on the waveguide 14 facet 36. For many lasers, the distance between the bottom of the laser and the light signal output is thicker than the distance between the top of the laser and the light signal output. As a result, the laser can be flipped upside down to reduce the required depth of the recess 34.

The lasers can be positioned such that a light signal from a laser is incident on the facet 36 of a waveguide 14 at an angle $\alpha$ where $\alpha$ is measured relative to the direction of propagation of the light signals along the waveguide 14. The angle $\alpha$ can reduce the effects of back reflection in the waveguide 14. In some instances, the angle $\alpha$ is 0°. When the angle $\alpha$ is greater than 0, suitable values for $\alpha$ include, but are not limited to, angles greater than or equal to 4° or 6° and/or less than or equal to 8°, 10° or 20°. In some instances, the angle $\alpha$ is in a range of 6° to 8°.

Figure 3C:
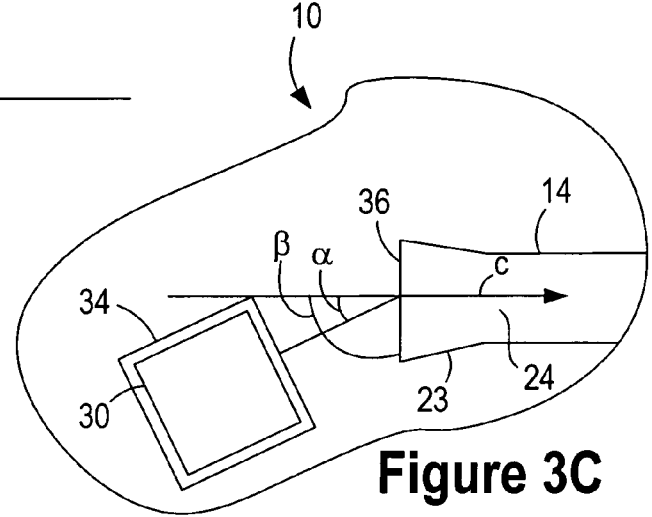
FIG. 3C is a top view of an optical device having a waveguide ending at a facet that is substantially vertical and is angled at less than ninety degrees relative to the direction of propagation at the facet.

The facet 36 can have an angle $\beta$ measured relative to the direction of propagation as shown in FIG. 3C. FIG. 3C is a top view of a single waveguide on the optical device. The facet 36 can be substantially vertical or can be angled relative to vertical. A substantially vertical facet 36 can simplify the fabrication process. The effects of back reflection can be reduced when the angle $\beta$ is less than 90°. In some instances, the angle $\beta$ is 90°. When the angle $\beta$ is less than 90°, suitable values for $\beta$ include, but are not limited to, angles greater than or equal to 70°, 80° and 82° and/or less than or equal to 84° or 86°. In some instances, the angle $\beta$ is in a range of 82° to 84°.

When the facet 36 has an angle $\beta$ less than 90°, the suitable values for the value $\alpha$ can be different from the values provided above. For instance, the lasers can be positioned so as to produce a light signal that enters the waveguide 14 traveling in a direction parallel to the direction of propagation as shown by the ray labeled C. In general, the position of the laser accounts for the effects of refraction upon entering the waveguide 14 when $n_{gap}*\sin(90°-\beta+\alpha)=n_{wg}*\sin(90°-\beta)$ where $n_{gap}$ is the index of refraction of the medium between the laser and the facet and $n_{wg}$ is the index of refraction of the waveguide. Accordingly, when an air gap is formed between the laser and the facet 36 and $\beta>0$, the laser can be positioned such that $|\alpha|>90°-\beta|$ to generate a light signal that enters the waveguide traveling in a direction parallel to the direction of propagation. As $n_{gap}$ increases relative to $n_{wg}$, $|\alpha|$ becomes less than $|90°-\beta|$ and when $n_{gap}>n_{wg}$, $|\alpha|<|90°-\beta|$. Hence, $\alpha$ is greater than 6° in some instances.

When more than on facet 36 has an angle $\beta$ less than 90°, the facets 36 can each be angled in the same direction or different facets 36 can be angled in the opposite direction. For instance, one or more of the facets 36 can have an angle that is $+\beta$ while one or more other facets 36 can have an angle that is $-\beta$. Further, adjacent facets 36 can have $\beta$ values with opposite directions so as to create a zigzag effect along the facets 36.

Although the recesses 34 are shown extending into the substrate 29, the recesses 34 can be constructed so as to extend to the insulator 28 or part way into the insulator 28. Alternately, the recesses 34 can be constructed so as to extend part way into the light transmitting medium 16. For instance, the recess 34 can be constructed such that a layer of the light transmitting medium 16 is located between the bottom of a recess 34 and the base 18.

Although the recesses 34 are shown positioned in a common trench 32, the recesses 34 can be formed in different trenches. As a result, the lasers would each be positioned in a different trench. Placing the lasers in different trenches can help to optically isolate the lasers from one another. Further, the trench may be eliminated altogether. For instance, the recesses 34 can be formed in the upper surface of the light transmitting medium 16.

The above design principles can be applied to a multiplexer 12 having as few as two input waveguides 14. However, when a multiplexer 12 is constructed such that light signals from a single input waveguide 14 experience multiple intersections before reaching an output waveguide 14, the optical loss associated with each of the intersections begins to cascade. Accordingly, the above construction advantages becomes most pronounced with multiplexers 12 having three or more input waveguides 14 arranged such that light signals from one or more of the input waveguides 14 experience multiple waveguide 14 intersections.

Although the above disclosure shows waveguide intersections where only two waveguides 14 intersect one another. The multiplexer 12 can include waveguide 14 intersections where three or more waveguides 14 come together.

Figure 4A:
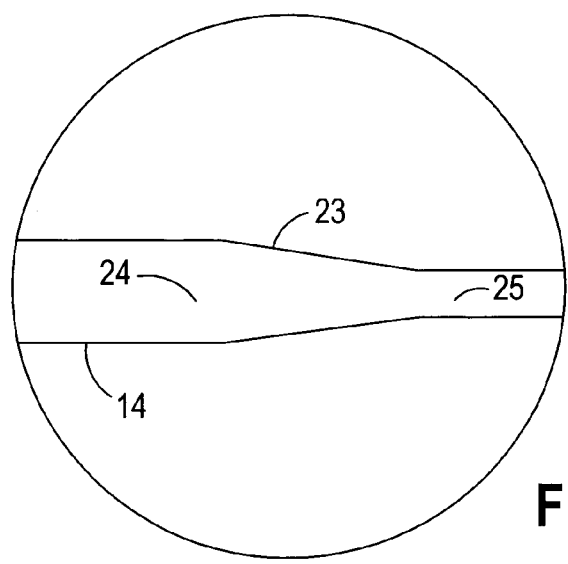
FIG. 4A is a top view of an optical device having a waveguide with a taper positioned midway along the waveguide.

Although FIG. 1A through FIG. 3C show the tapers positioned at an end of a waveguide, the tapers need not be positioned at an end of a waveguide. For instance, FIG. 4A is a top view of an optical device having a waveguide with a taper positioned midway along the waveguide. The illustrated waveguide 14 can be an input waveguide or an output waveguide. Accordingly, the taper can be a contraction taper or and expansion taper.

Figure 4B:
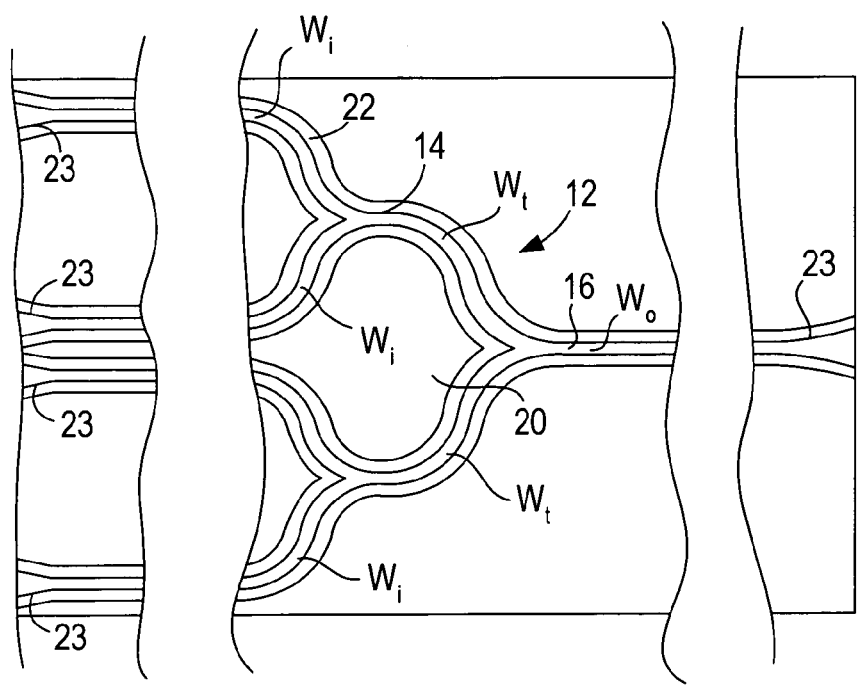
FIG. 4B illustrate that additional optical components can be positioned between the waveguide intersections and an expansion taper and/or between the waveguide intersections and a contraction taper.

Additional optical components can be positioned between the tapers and the waveguide intersections. For instance, the optical device discontinuities in FIG. 4B illustrate that additional optical components can be positioned between the waveguide intersections and an expansion taper 26 and/or between the waveguide intersections and a contraction taper 23. Suitable optical components for positioning between the tapers and the waveguide intersections include, but are not limited to, optical attenuators. Optical attenuators positioned between the contraction tapers 23 and the waveguide intersections can be employed to adjust the intensities of the light signals traveling on different input waveguide and/or to modulate light signals traveling on different input waveguides. Suitable attenuator constructions and methods for forming optical attenuators on the optical device are taught in U.S. patent application Ser. No. 10/371,642, filed on Feb. 21, 2003, entitled "Attenuator Having Reduced Optical Loss in the Pass Mode" and incorporated herein in its entirety.

Figure 5A:
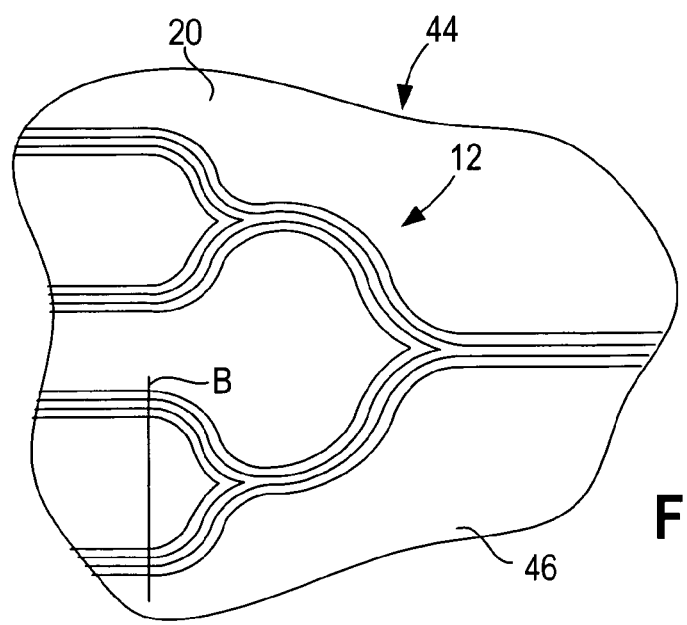
FIG. 5A through FIG. 5D illustrate a method of forming a multiplexer constructed according to FIG. 1A and FIG. 1B.
Figure 5B:
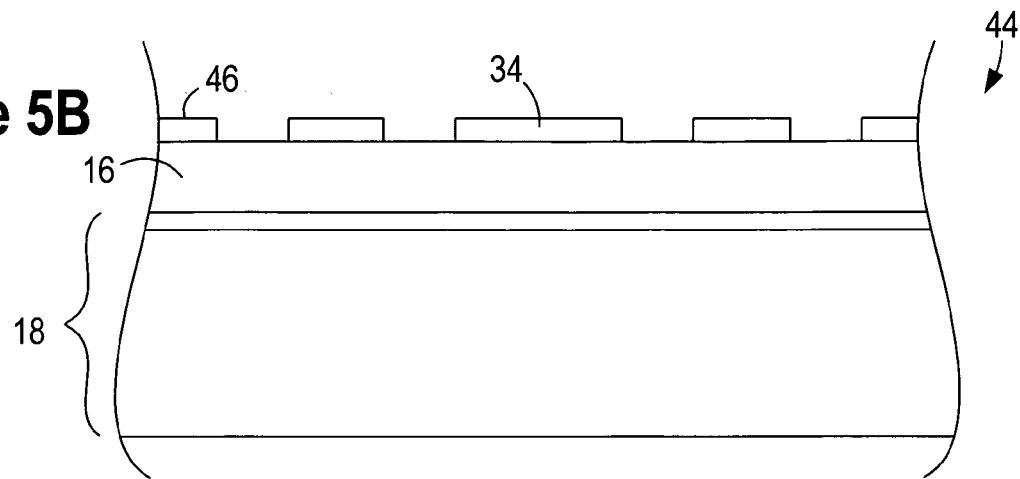

FIG. 5A through FIG. 5D illustrate a method of forming an optical device 10 according to FIG. 1A through FIG. 1B. The method can be performed on a wafer having a light transmitting medium 16 positioned on a base 18. An example of a suitable wafer includes, but is not limited to, a silicon-on-insulator wafer. A mask 46 is formed on the wafer so as to provide the device precursor 44 illustrated in FIG. 5A and FIG. 5B. FIG. 5A is a top view of the device precursor 44 and FIG. 5B is a cross section of the device precursor 44 shown in FIG. 5A taken along the line labeled B. The mask 46 is formed so as to protect the regions of the device precursor 44 where the waveguides 14 and the inactive regions 20 will be formed while leaving exposed the region of the device precursor 44 where the waveguide trenches 22 are to be formed. A suitable mask 46 includes, but is not limited to, a photo resist or an oxide.

Figure 5C:
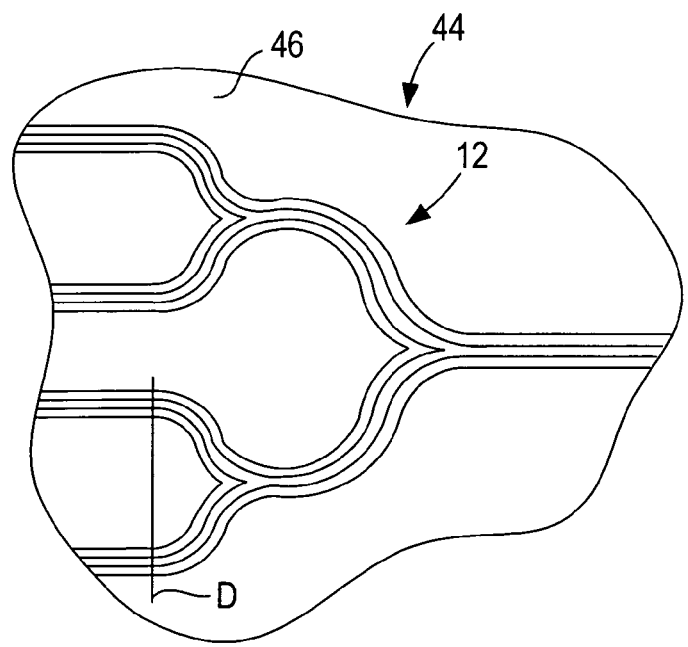
Figure 5D:
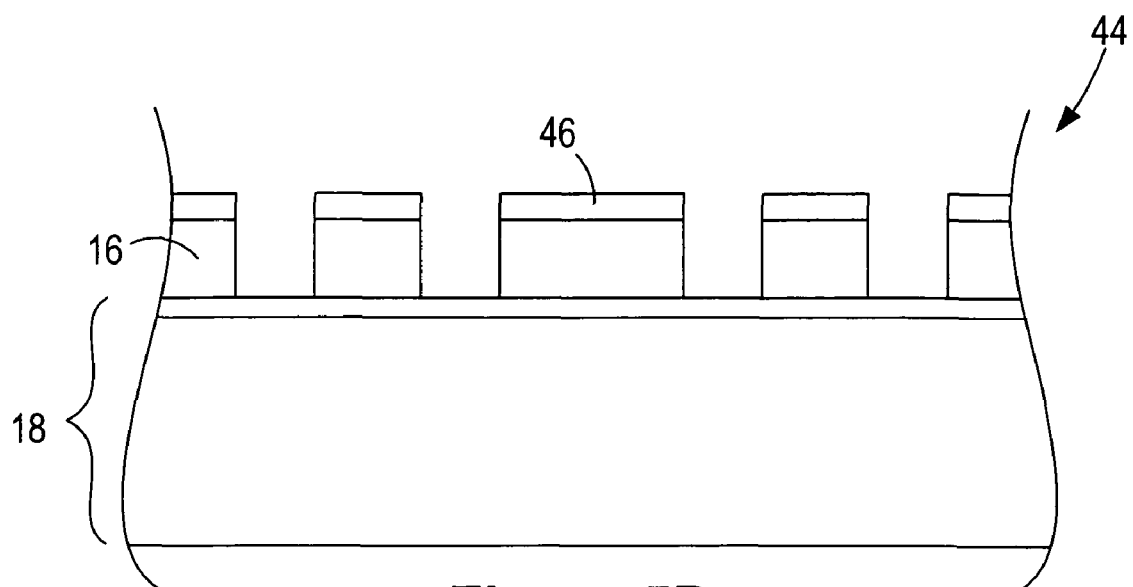

An etch is performed on the device precursor 44 so as to provide the device precursor 44 of FIG. 5C and FIG. 5D. FIG. 5C is a top view of the device precursor 44 and FIG. 5D is a cross section of the device precursor 44 shown in FIG. 5C taken along the line labeled D. The etch is performed for a duration sufficient to form the sides 27 of the waveguides 14 down to the base 18. Facets are formed as a result of the etch. When the facets are to be angled at less than ninety degrees relative to the direction or propagation, the mask 46 can be formed so as to provide the desired angle on the facet. Because the etch forms sides that are substantially vertical, the facet will be substantially vertical while being angled at less than ninety degrees relative to the direction of propagation.

Although not illustrated, the etch can be performed such that the sides are not performed to the level of the base so as to form a ridge waveguide. When the device precursor 44 is formed from a silicon-on-insulator wafer, the etch can be selected so the silica insulator 28 serves as an etch stop. The availability of the inherent etch stop simplifies the fabrication process.

The inactive regions 20 remain protected during the etch because the uniformity of many etches is limited. The protection of the inactive regions 20 limits the areas that are etched. Because limited areas of the device precursor 44 are etched, the effects of the etch uniformity limitations are reduced.

The device precursor 44 is diced so as to provide an optical device 10 having a multiplexer 12 constructed according to FIG. 1A and FIG. 1B.

Figure 6A:
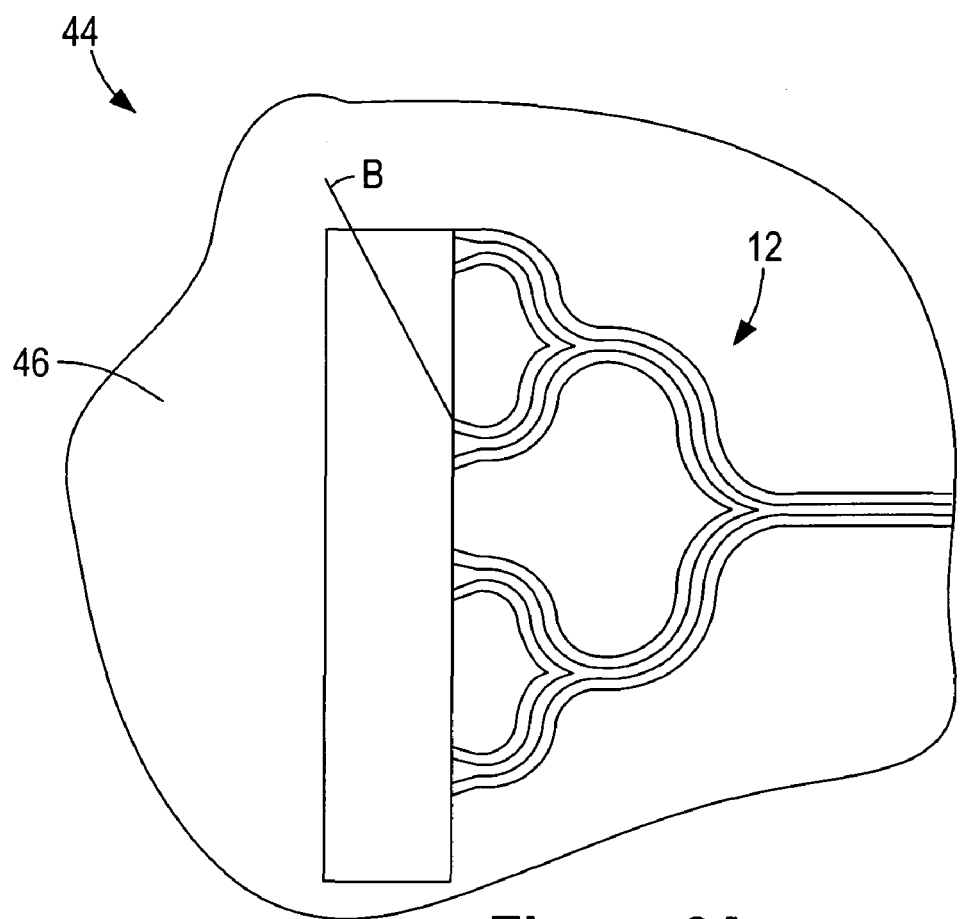
FIG. 6A through FIG. 6G illustrate a method of forming a multiplexer constructed according to FIG. 3A and FIG. 3B.
Figure 6B:
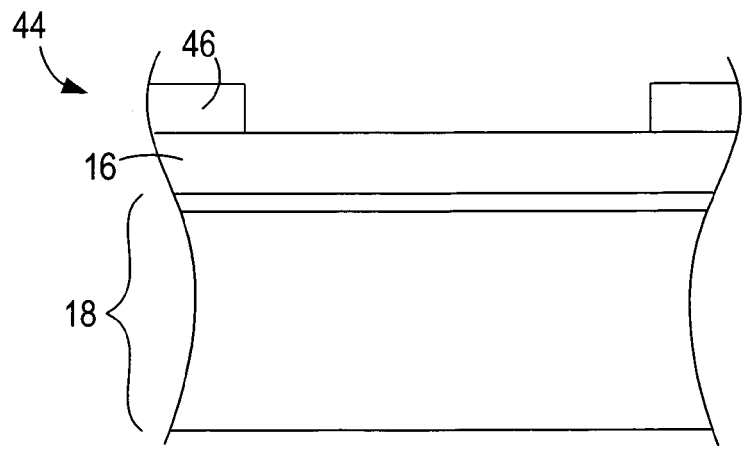

FIG. 6A through FIG. 6G illustrate a method of forming an optical device 10 according to FIG. 3A through FIG. 3B. The method can be performed on a wafer having a light transmitting medium 16 positioned on a base 18. An example of a suitable wafer includes, but is not limited to, a silicon-on-insulator wafer. A mask 46 is formed on the wafer so as to provide the device precursor 44 illustrated in FIG. 6A and FIG. 6B. FIG. 6A is a top view of the device precursor 44 and FIG. 6B is a cross section of the device precursor 44 shown in FIG. 6A taken along the line labeled B. The mask 46 is formed so as to protect the regions of the device precursor 44 where the waveguides 14 and the inactive regions 20 will be formed while leaving exposed the region of the device precursor 44 where the common trench 32 and the waveguide trenches 22 are to be formed. A suitable mask 46 includes, but is not limited to, a photoresist or oxide.

Figure 6C:
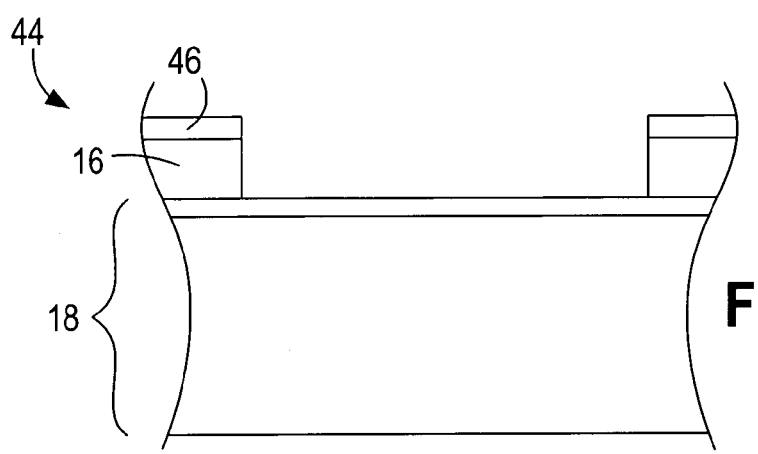

An etch is performed on the device precursor 44 so as to provide the device precursor 44 of FIG. 6C. The etch is performed for a duration sufficient to form the sides 27 of the waveguides 14 down to the base 18. The common trench 32 is also formed down to the base 18 during the etch. When the device precursor 44 is formed from a silicon-on-insulator wafer, the etch can be selected so the silica insulator 28 serves as an etch stop.

Figure 6D:
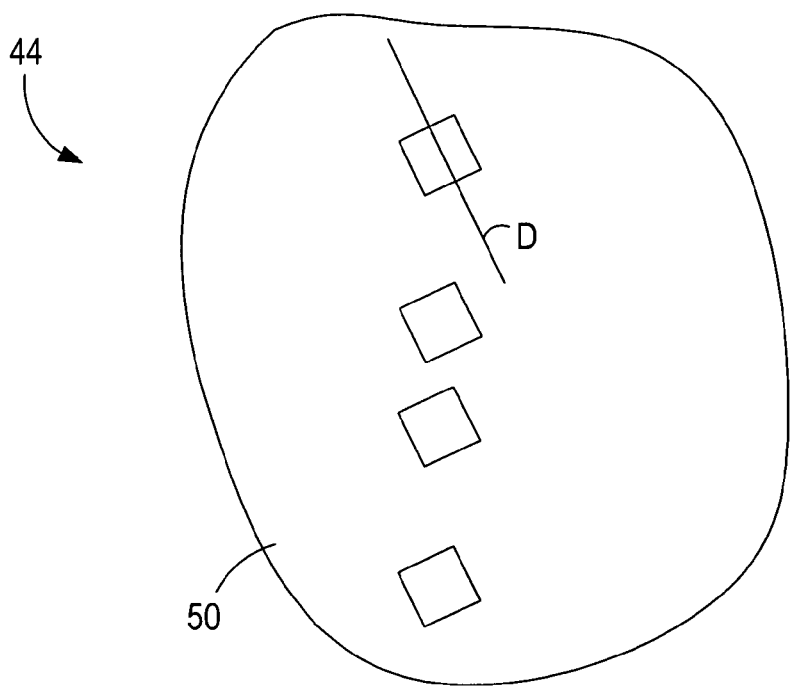
Figure 6E:
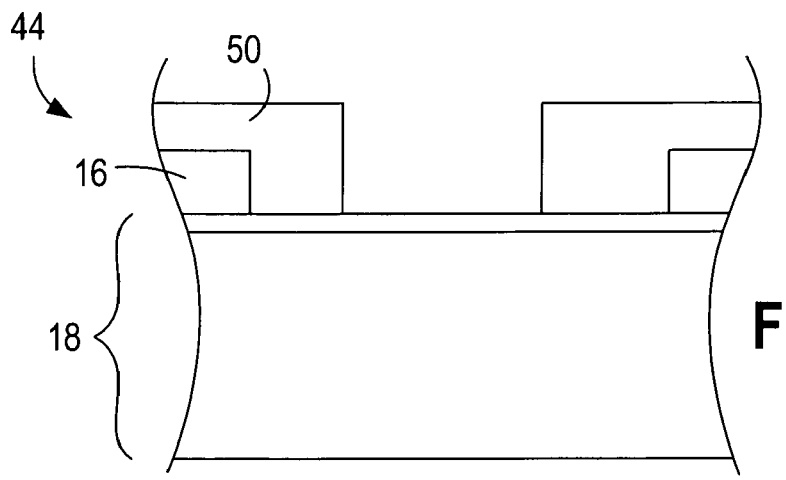

The mask 46 is removed and a second mask 50 formed on the device precursor 44 of FIG. 6C so as to provide the device precursor 44 of FIG. 6D and FIG. 6E. The second mask 50 is formed such that the recesses 34 where the lasers are to be positioned remain exposed while the remainder of the device precursor 44 is protected. A suitable second mask 50 includes, but is not limited to, a photoresist or an oxide.

Figure 6F:
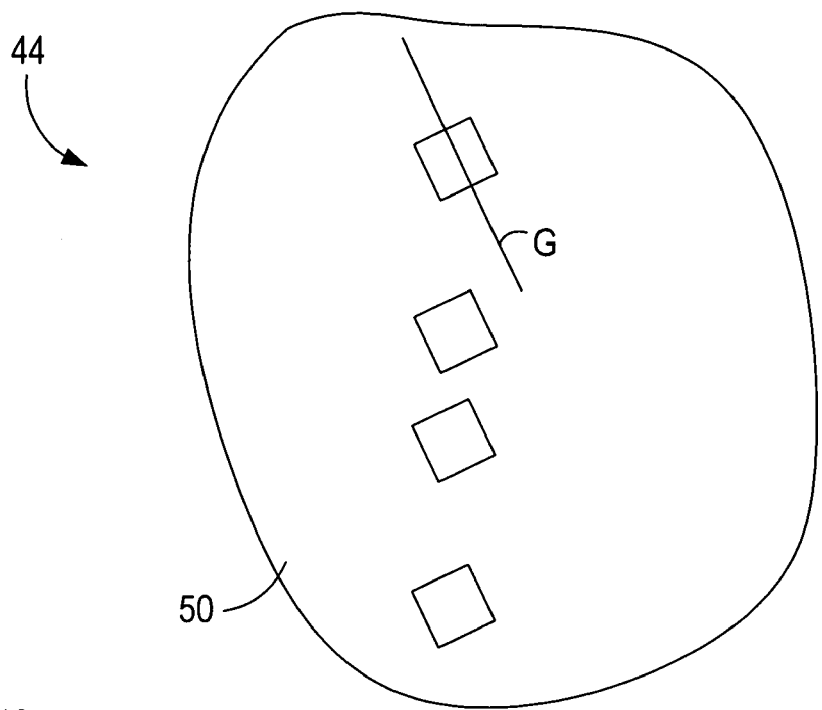
Figure 6G:
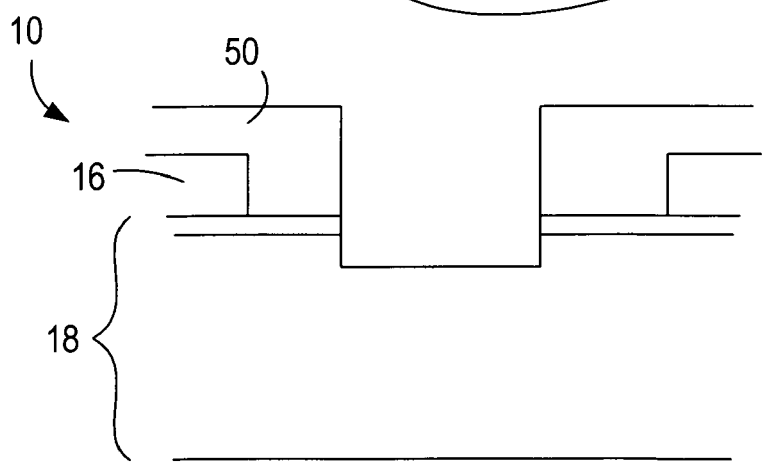

A second etch is performed so as to provide the device precursor 44 shown in FIG. 6F and FIG. 6G. FIG. 6F is a top view of the device precursor 44 and FIG. 6G is a cross section of the device precursor 44 shown in FIG. 6F taken along the line labeled G. The second etch is performed for a duration sufficient to form the recesses 34 to the desired depth.

The second mask 50 is removed and the device precursor 44 diced so as to provide the optical device 10 shown in FIG. 3A and FIG. 3B. The lasers can be placed in the recesses 34 before or after the dicing of the device precursor 44. Epoxies and adhesives can be employed to immobilize the lasers in the recess 34. Other fastening and welding techniques can also be employed to immobilize the lasers in the recess 34. For instance, ultrasonic bonding can be employed to immobilize the lasers in the recess 34.

Metal traces can be formed on the optical device so as to provide any contact pads and conductors for providing electrical communication to the light sources. In some instances, a contact pad is formed in the bottom of one or more recesses depending of the type of laser being employed. The metal traces can be formed before or after dicing. Additionally, any additional wire connections can be made before or after dicing.

The method shown in FIG. 6A through FIG. 6G can be modified so the recesses 34 are formed in a different trench. For instance, the mask 46 shown in FIG. 6A can be modified so independent trenches are positioned at the end of each waveguide 14.

As noted above, one or more of the tapers may taper vertically. A suitable method for forming a waveguide having a taper in both the vertical and horizontal direction is taught in U.S. patent application Ser. No. 10/345,709, filed on Jan. 15, 2003, entitled "Controlled Selectivity Etch for Use With Optical Component Fabrication" and incorporated herein in its entirety.

As is evident from the above discussion, the inactive regions 20 are present on the optical device 10 as a result of fabrication methodology. The inactive regions 20 do not carry light signals during operation of the optical device 10. As a result, the inactive regions 20 are optional and need not be included on the optical device 10. Accordingly, processing can be done to remove the inactive regions 20. Alternately, the optical device 10 can be fabricated using a method that does not result in formation of the inactive regions 20.

In some instances, the waveguide facets may require an anti-reflective coating due to the high index of refraction of silicon. An anti-reflective coating may be employed whether the facets are coupled with an optical fiber or a light source. Further, an anti-reflective coating may be employed when a light source is integrated with the optical device. The anti-reflective coating may be formed using standard anti-reflective coating formation techniques.

Although the optical is described as including a multiplexer, the multiplexer can be operated in reverse so as to split a light signal into four different light signals having reduced intensities. When the multiplexer is operated in reverse, the contraction tapers serve to expand the light signal and the expansion tapers serve to expand the light signals.

Although the multiplexers illustrated above show each of the input waveguides including a contraction taper, in some instances, a portion of the input waveguides include a contraction taper. Further, the optical device can include more than one multiplexer and/or more than one output waveguide. In these instances, a portion of the output waveguides can include expansion tapers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
multi-mode waveguides positioned on a base, the waveguides including input waveguides, transition waveguides, and an output waveguide,
the waveguides intersecting one another such that the transition waveguides carry light signals from the input waveguides to the output waveguide and combine the light signals onto the output waveguide,
at least a portion of the input waveguides including a contraction taper configured to contract the width of a light signal traveling along the input waveguide toward the output waveguide, wherein the contraction tapers do not taper vertically.

2. The device of claim 1, wherein at least a portion of the contraction tapers taper from an expanded end to a contracted end having a width less than 30% of the width of the expanded end.

3. The device of claim 1, wherein at least a portion of the contraction tapers have a contracted end with width greater than 12 μm.

4. The device of claim 1, wherein at least a portion of the contraction tapers have a taper ratio in a range of than 8:1 to 200:1, the taper ratio being a ratio of the taper length:the taper width.

5. The device of claim 1, wherein at least one output waveguide includes an expansion taper configured to expand a light signal traveling along the output waveguide away from the input waveguides.

6. The device of claim 5, wherein the expansion tapers do not taper vertically.

7. The device of claim 5, wherein the expansion tapers expand from a contracted end to an expanded end, the contracted end having a width less than 80% of the width of the expanded end.

8. The device of claim 5, wherein at least a portion of the expansion tapers have a taper ratio in a range of 8:1 to 200:1, the taper ratio being a ratio of the taper length:the taper width.

9. The device of claim 1, wherein one or more of the waveguide intersections is constructed such that a waveguide configured to carry output from the intersection has a width greater than a width of each waveguide configured to carry input to the intersection.

10. The device of claim 1, wherein the waveguides have lateral sides that extend down to the base.

11. The device of claim 1, wherein one or more of the waveguides end at a facet that is substantially vertical relative to a base, each facet being angled at less than ninety degrees relative to a direction of propagation of a light signal traveling along the waveguide at the facet.

12. The device of claim 1, further comprising:
one or more inactive regions spaced apart from the waveguides so as to define waveguide trenches adjacent to the waveguides.

13. The device of claim 1, wherein the waveguides have a thickness between 16 μm and 75 μm and a width between 16 μm and 75 μm.

14. The device of claim 1, wherein each waveguide has a width that is more than 1.4 times a width of the waveguide.

15. The device of claim 1, further comprising:
a plurality of light sources for generating light signals, each light source being positioned in a recess on the base such that a light signal generated by the light source enters an input waveguide.

16. The device of claim 1, wherein the waveguides are immobilized along their length relative to the base.

17. The device of claim 1, wherein the waveguides intersect one another in accordance with Y-type intersections where a light signal carrying region in one of the intersecting waveguides goes through a continuous and unbroken transition into a light signal carrying region in each of the other intersecting waveguides.

18. The device of claim 1, wherein a pair of the input waveguides intersect at one of the transition waveguides such that the light signals traveling along the pair of input waveguides are transferred from the input waveguides to the transition waveguide intersected by the pair of input waveguides.

19. The device of claim 1, wherein each input waveguide that includes a contraction taper terminates at a transition waveguide and excludes an expansion taper between the contraction taper and the transition waveguide at which the input waveguide terminates.

20. The device of claim 1, wherein input waveguides that include a contraction taper also include a portion that is not-tapered.

21. The device of claim 1, wherein the contraction tapers are positioned along a length of the input waveguides and are not included in an intersection of the waveguides.

22. An optical device, comprising:
multi-mode waveguides positioned on a base, the waveguides including input waveguides, transition waveguides, and an output waveguide,
the waveguides intersecting one another such that the transition waveguides carry light signals from the input waveguides to the output waveguide and combine the light signals onto the output waveguide,
the output waveguide including an expansion taper configured to expand the width of a light signal traveling along the output waveguide after having traveled through an input waveguide,
wherein the expansion tapers do not taper vertically.

23. The device of claim 22, wherein at least a portion of the expansion tapers taper from an expanded end to a contracted end having a width less than 30% of the width of the expanded end.

24. The device of claim 22, wherein at least a portion of the expansion tapers have a contracted end with width greater than 10 μm.

25. The device of claim 22, wherein at least a portion of the expansion tapers have a taper ratio in a range of than 8:1 to 200:1, the taper ratio being a ratio of the taper length:the taper width.

26. The device of claim 22, wherein the waveguides are immobilized along their length relative to the base.

27. An optical device, comprising:
multi-mode waveguides positioned on a base, the waveguides including input waveguides, transition waveguides, and an output waveguide,
the waveguides intersecting one another such that the transition waveguides carry light signals from the input waveguides to the output waveguide and combine the light signals onto the output waveguide,
at least a portion of the input waveguides including a contraction taper configured to contract the width of a light signal traveling along the input waveguide toward the output waveguide, and
wherein one or more of the waveguides end at a facet that is substantially vertical relative to a base, each facet being angled at less than ninety degrees relative to a direction of propagation of a light signal traveling along the waveguide at the facet.

28. The device of claim 27, wherein at least a portion of the facets that are angled at less than ninety degrees relative to the direction of propagation are positioned at the end of a contraction taper.

29. The device of claim 27, wherein at least a portion of the contraction tapers taper from an expanded end to a contracted end having a width less than 30% of the width of the expanded end.

30. The device of claim 27, wherein at least a portion of the contraction tapers have a contracted end with width greater than 12 μm.

31. The device of claim 27, wherein at least a portion of the contraction tapers have a taper ratio in a range of than 8:1 to 200:1, the taper ratio being a ratio of the taper length:the taper width.

32. The device of claim 27, wherein at least one output waveguide includes an expansion taper configured to expand a light signal traveling along the output waveguide.

33. The device of claim 32, wherein the expansion tapers expand from a contracted end to an expanded end, the contracted end having a width less than 80% of the width of the expanded end.

34. The device of claim 32, wherein at least a portion of the expansion tapers have a taper ratio in a range of 8:1 to 200:1, the taper ratio being a ratio of the taper length:the taper width.

35. The device of claim 27, wherein one or more of the waveguide intersections is constructed such that a waveguide configured to carry output from the intersection has a width greater than a width of each waveguide configured to carry input to the intersection.

36. The device of claim 27, wherein lateral sides of the waveguides extend down to the base.

37. The device of claim 27, further comprising:
one or more inactive regions spaced apart from the waveguides so as to define waveguide trenches adjacent to the waveguides.

38. The device of claim 27, wherein the waveguides have a thickness between 16 μm and 75 μm and a width between 16 μm and 75 μm.

39. The device of claim 27, wherein each waveguide has a thickness that is more than 1.4 times a width of the waveguide.

40. The device of claim 27, further comprising:
a plurality of light sources for generating light signals, each light source being positioned in a recess on the base such that a light signal generated by the light source enters an input waveguide.

41. The device of claim 27, wherein the waveguides are immobilized along their length relative to the base.

42. An optical device, comprising:
multi-mode waveguides positioned on a base, the waveguides including input waveguides, transition waveguides, and an output waveguide,
the waveguides intersecting one another such that the transition waveguides carry light signals from the input waveguides to the output waveguide and combine the light signals onto the output waveguide,
the output waveguide including an expansion taper configured to expand the width of a light signal traveling along the output waveguide after having traveled through an input waveguide, and
wherein one or more of the waveguides end at a facet that is substantially vertical relative to a base, each facet being angled at less than ninety degrees relative to a direction of propagation of a light signal traveling along the waveguide at the facet.

43. The device of claim 42, wherein at least a portion of the facets that are angled at less than ninety degrees relative to the direction of propagation are positioned at the end of an expansion taper.

44. The device of claim 42, wherein at least a portion of the expansion tapers taper from an expanded end to a contracted end having a width less than 30% of the width of the expanded end.

45. The device of claim 42, wherein at least a portion of the expansion tapers have a contracted end with width greater than 10 μm.

46. The device of claim 42, wherein at least a portion of the expansion tapers have a taper ratio in a range of than 8:1 to 200:1, the taper ratio being a ratio of the taper length:the taper width.

47. The device of claim 42, wherein the waveguides are immobilized along their length relative to the base.

48. An optical device, comprising:
multi-mode waveguides positioned on a base, the waveguides including input waveguides, transition waveguides, and an output waveguide,
the waveguides intersecting one another such that the transition waveguides carry light signals from the input waveguides to the output waveguide and combine the light signals onto the output waveguide,
at least a portion of the input waveguides including a contraction taper configured to contract the width of a light signal traveling along the input waveguide toward the output waveguide,
and wherein each waveguide has a thickness that is more than 1.4 times a width of the waveguide.

49. The device of claim 48, wherein the waveguides are immobilized along their length relative to the base.

50. An optical device, comprising:
multi-mode waveguides positioned on a base, the waveguides including input waveguides, transition waveguides, and an output waveguide,
the waveguides intersecting one another such that the transition waveguides carry light signals from the input waveguides to the output waveguide and combine the light signals onto the output waveguide, the output waveguide including an expansion taper configured to expand the width of a light signal traveling along the output waveguide after having traveled through an input waveguide, and wherein each waveguide has a thickness that is more than 1.4 times a width of the waveguide.

51. The device of claim 50, wherein the waveguides are immobilized along their length relative to the base.

52. The device of claim 17, wherein the waveguides include at least four input waveguides.

53. The device of claim 20, wherein the non-tapered portion is between the contraction taper and one of the transition waveguides.

* * * * *